(12) United States Patent
Joh et al.

(10) Patent No.: US 12,173,636 B1
(45) Date of Patent: Dec. 24, 2024

(54) INTERNAL COMBUSTION ENGINE

(71) Applicant: HONDA MOTOR CO., LTD., Tokyo (JP)

(72) Inventors: Yuichiro Joh, Saitama (JP); Haruya Kitano, Saitama (JP); Takeshi Ueno, Saitama (JP); Taiki Katayama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/631,059

(22) Filed: Apr. 10, 2024

(51) Int. Cl.
| | | |
|---|---|---|
| *F01N 3/20* | (2006.01) | |
| *F02B 37/04* | (2006.01) | |
| *F02B 39/10* | (2006.01) | |
| *F02D 41/02* | (2006.01) | |
| *F02N 11/08* | (2006.01) | |

(52) U.S. Cl.
CPC .............. *F01N 3/204* (2013.01); *F02B 37/04* (2013.01); *F02B 39/10* (2013.01); *F02D 41/024* (2013.01); *F02N 11/08* (2013.01)

(58) Field of Classification Search
CPC .......... F01N 3/204; F02B 37/04; F02B 39/10; F02D 41/024; F02N 11/08
See application file for complete search history.

(56) References Cited

U.S. PATENT DOCUMENTS 6,729,124 B2 * 5/2004 Baeuerle ................. F02P 15/02
60/285

FOREIGN PATENT DOCUMENTS

JP        2001123825 A        5/2001

* cited by examiner

*Primary Examiner* — Brandon D Lee
(74) *Attorney, Agent, or Firm* — CKC & Partners Co., LLC

(57) ABSTRACT

An internal combustion engine includes a cylinder, a piston, a crankshaft, a cylinder igniter, an intake passage, a fuel supplier, an exhaust passage, a catalytic converter disposed in the exhaust passage, an exhaust igniter that is disposed upstream of the catalytic converter in the exhaust passage and s generates a spark in the interior of the exhaust passage, and a controller that controls a preheating process for heating the catalytic converter by controlling supply of the air-fuel mixture to the exhaust passage and ignition of the air-fuel mixture by the exhaust igniter. The internal volume of the exhaust passage from the cylinder to an installation position of the exhaust igniter is equal to or less than a volume of the air-fuel mixture discharged from the cylinder in one exhaust stroke in the exhaust passage.

7 Claims, 2 Drawing Sheets

INTERNAL COMBUSTION ENGINE

BACKGROUND OF THE INVENTION

Field of the Invention

The present disclosure relates to an internal combustion engine.

Related Art

Efforts to alleviate or mitigate climate change are ongoing, and emission improvement is being researched and developed to this end. In general, an internal combustion engine for a four-wheeled vehicle utilizes a catalytic converter to remove air pollutants from exhaust gases. Since a catalytic converter cannot sufficiently perform its function when the catalyst is at a low temperature, a relatively large amount of air pollutants is discharged during a cold start of an internal combustion engine. Therefore, in order to reduce the environmental burden, it is necessary to reduce the amount of air pollutants that are discharged during a cold start. From such a viewpoint, technologies have been proposed in which, upon cold starting an internal combustion engine, a catalytic converter is heated by combusting an air-fuel mixture in an exhaust passage to activate the catalyst to reduce the amount of air pollutants that are discharged (for example, refer to Japanese Unexamined Patent Application, Publication No. 2001-123825).

SUMMARY OF THE INVENTION

In emission improvement, the amount of air pollutants that are discharged during heating of a catalytic converter cannot be ignored, and thus reducing the amount of the air pollutants that are discharged during heating of the catalytic converter is also an aim of the present disclosure. In the technology disclosed in Japanese Unexamined Patent Application, Publication No. 2001-123825, attempts have been made to improve stability of ignition and combustion, but sufficient consideration has not been given to the amount of air pollutants that are discharged during heating of a catalytic converter. In order to solve the above problems, the present disclosure aims to achieve a reduction in the amount of air pollutants that are discharged during heating of a catalytic converter. Consequently, the present disclosure also contributes to alleviating or mitigating climate change.

The present inventors found that by reviewing structures for combusting an air-fuel mixture in an exhaust passage, it is possible to reduce an amount of air pollutants that are discharged during heating of a catalytic converter and arrived at the present disclosure. The present invention relates to the following internal combustion engines of (1) to (7).

(1) An internal combustion engine including: a cylinder; a piston housed in the cylinder; a crankshaft coupled to the piston; a cylinder igniter that generates a spark in an interior of the cylinder; an intake passage that supplies combustion air to the cylinder; a fuel supplier that supplies fuel to the intake passage or the cylinder; an exhaust passage that discharges from the cylinder the exhaust gases generated by combustion of an air-fuel mixture of the combustion air and the fuel in the cylinder; a catalytic converter disposed in the exhaust passage; an exhaust igniter disposed upstream of the catalytic converter in the exhaust passage and that generates a spark in an interior of the exhaust passage; and a controller that controls a preheating process for heating the catalytic converter by controlling supply of the air-fuel mixture to the exhaust passage and ignition of the air-fuel mixture by the exhaust igniter. An internal volume of the exhaust passage from the cylinder to an installation position of the exhaust igniter is equal to or less than a volume of the air-fuel mixture discharged from the cylinder in one exhaust stroke in the exhaust passage.

According to the invention of (1), the internal volume of the exhaust passage to the position where the exhaust igniter is disposed is equal to or less than the volume of the air-fuel mixture discharged from the cylinder in one exhaust stroke, and thus it is possible to shorten a retention time of uncombusted air-fuel mixture in the exhaust passage. With the above configuration, diffusion of the uncombusted air-fuel mixture can be reduced or prevented, and therefore the fuel can be substantially completely combusted in the exhaust passage with more reliability, allowing the amount of the air pollutants that are discharged in the preheating process to be reduced.

(2) The internal combustion engine of (1) further includes: a supercharger including a turbine provided in the exhaust passage and a compressor provided in the intake passage, in which the exhaust igniter is disposed downstream of the turbine.

According to the invention of (2), by disposing the exhaust igniter downstream of the turbine in the internal combustion engine including the supercharger, it is possible to prevent the turbine from damaged and to suppress temperature drop of the exhaust gases due to pressure drop of the exhaust gases.

(3) The internal combustion engine of (2), in which the supercharger further includes a turbo electric motor capable of driving the compressor, and the controller causes the turbo electric motor to drive the compressor during the preheating process.

According to the invention of (3), even during preheating control in which combustion of the air-fuel mixture in the cylinder is stopped, the pressure of the supplied combustion air can be kept high by the supercharger, and therefore the air-fuel mixture can be reliably supplied to the exhaust igniter downstream of the turbine in one exhaust stroke.

(4) The internal combustion engine of (1) to (3) includes: a plurality of the cylinders. The exhaust passage includes a plurality of branch parts connecting to the cylinders on a one-to-one basis, and a collection part at which the plurality of branch parts converges, and the exhaust igniter is disposed in the collection part.

According to the invention of (4), the number of exhaust igniters can be reduced by disposing the exhaust igniter in the collection part.

(5) The internal combustion engine of (1) to (4), in which the controller starts discharging the air-fuel mixture from the cylinder for which an internal volume of the exhaust passage from the cylinder to an installation position of the exhaust igniter is smallest, in the preheating process.

According to the invention of (5), the diffusion of the air-fuel mixture can be reduced or prevented as the internal volume of the exhaust passage to the exhaust igniter becomes smaller, and therefore the amount of air pollutants that are discharged at the start of the preheating process can be reduced by starting fuel injection at a cylinder for which an internal volume of the exhaust passage from the cylinder to an installation position of the exhaust igniter is smallest.

(6) The internal combustion engine of (4) or (5), in which the controller, at least immediately after a start of the preheating process, causes the exhaust igniter to generate, for each cylinder, a spark at least once during a period from when a cylinder of the plurality of cylinders starts the exhaust stroke to when another cylinder of the plurality of cylinders that share the exhaust igniter starts the exhaust stroke.

According to the invention of (6), the uncombusted air-fuel mixture discharged from each cylinder can be reliably ignited, and therefore the amount of air pollutants that are discharged can be more reliably reduced.

(7) The internal combustion engine of (1) to (7) further includes: a crank electric motor capable of driving the crankshaft, in which the controller causes the crank electric motor to drive the crankshaft during the preheating process.

According to the invention of (7), the uncombusted air-fuel mixture can be efficiently fed into the exhaust passage, and therefore it is possible to quickly heat the catalytic converter, and as a result, it is possible to reduce or prevent discharge of the air pollutants during the preheating process.

DETAILED DESCRIPTION OF THE INVENTION

The following describes embodiments of the present disclosure with reference to the accompanying drawings. However, the present disclosure is not limited to the following embodiments, and can be appropriately modified and implemented without departing from the gist of the present disclosure.

Figure 1:
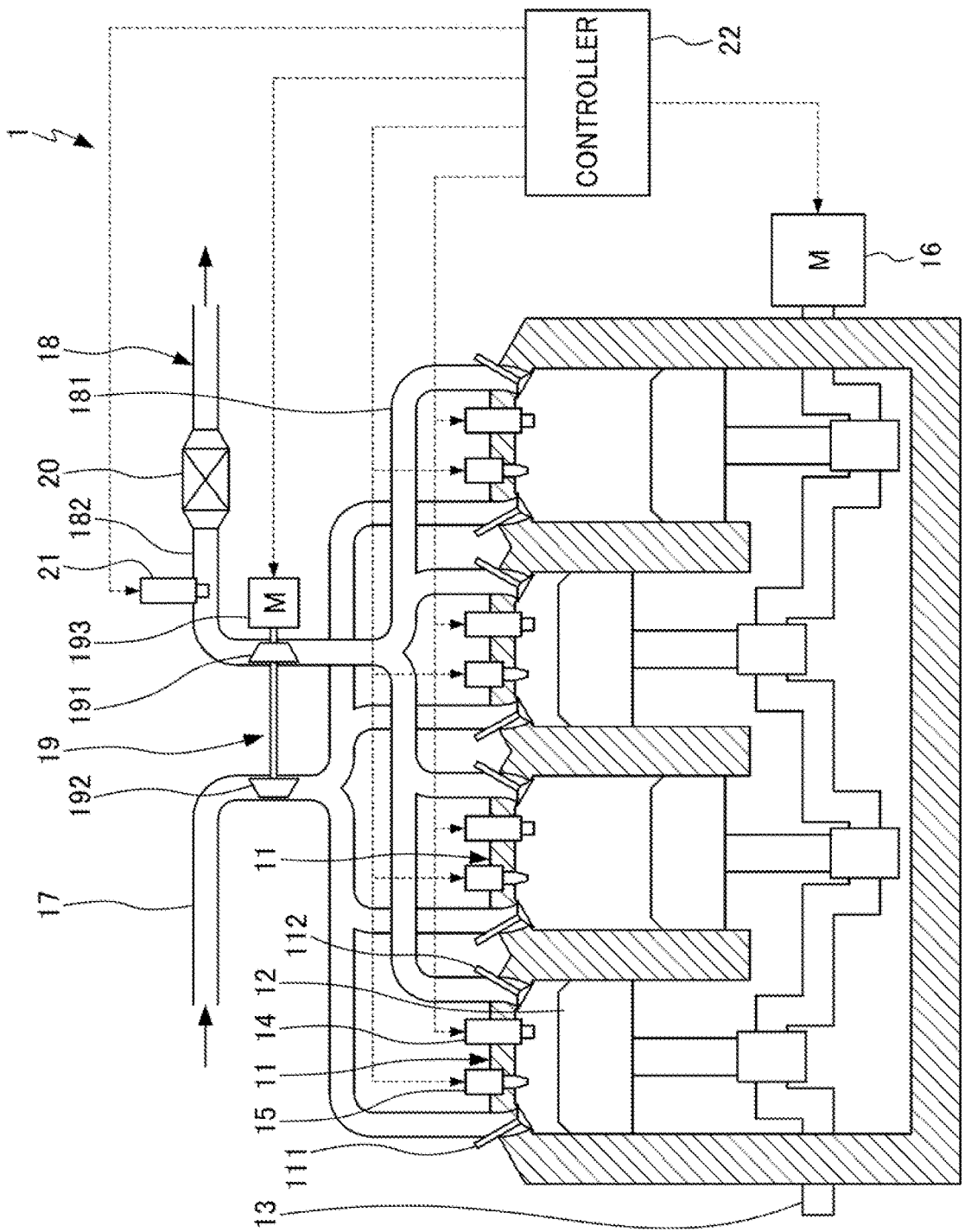
FIG. 1 is a schematic view illustrating a configuration of an engine according to an embodiment of the present disclosure.

FIG. 1 is a schematic view illustrating a configuration of an internal combustion engine 1 according to an embodiment of the present disclosure.

An internal combustion engine 1 includes a crankshaft 13, a crank electric motor 16, an intake passage 17, an exhaust passage 18, a supercharger 19, a catalytic converter 20, an exhaust igniter 21, and a controller 22, and a plurality of cylinders 11.

Each cylinder 11 is provided with an air supply valve 111 and an exhaust valve 112 that are each opens and close an internal space of the respective cylinder 11. Each piston 12 accommodates in the respective cylinder 11. The crankshaft 13 is connected to the pistons 12 so as rotates in response to the piston 12 reciprocating vertically. The cylinder igniter 14 generates a spark in the respective cylinder 11. The cylinder igniter 14 may have a known ignition plug. The fuel supplier 15 supplies fuel into the cylinder 11. The fuel supplier 15 may have a known injector, and may be provided for each cylinder. The fuel supplier 15 may be configured to supply fuel to the intake passage 17 so as to supply fuel into the cylinder 11 through the intake passage 17. The crank electric motor 16 is disposed so as to be able to drive the crankshaft 13. The crank electric motor 16 may also be used as a cell motor starts an operation of the internal combustion engine 1.

The intake passage 17 communicates with the cylinder 11 through the air supply valve 111, and supplies combustion air into the cylinder 11. The exhaust passage 18 communicates with the cylinder 11 through the exhaust valve 112, and discharges exhaust gases generated by combustion of the air-fuel mixture of the combustion air and the fuel in the cylinder 11. The exhaust passage 18 includes a plurality of branch parts 181 connected to the respective cylinders 11, and a collection part 182 at which the plurality of branch parts 181 converge. The supercharger 19 includes a turbine 191 provided in the exhaust passage 18 and a compressor 192 provided in the intake passage 17, and converts the pressure of the exhaust gases in the exhaust passage 18 into a rotational force to pressurize combustion air in the intake passage 17. The turbine 191 is preferably provided in the collection part 182 so as to be capable of converting the pressure of the exhaust gases discharged from the plurality of cylinders 11 into the rotational force. The supercharger 19 may further include a turbo electric motor 193 capable of driving the compressor 192. The catalytic converter 20 is disposed in the exhaust passage 18 and removes air pollutants in the exhaust gases. The catalytic converter 20 includes, for example, a three-way catalyst, and may have a known configuration capable of removing air pollutants in the exhaust gases such as HC, CO, and NOx.

The exhaust igniter 21 is disposed upstream of the catalytic converter 20 in the exhaust passage 18 and generates a spark in the interior of the exhaust passage 18. With this configuration, it is possible to ignite the air-fuel mixture discharged from each cylinder 11 to the exhaust passage 18, and perform a preheating process for heating the catalytic converter 20 by heat from combustion of the air-fuel mixture. The internal volume of the exhaust passage 18 from each cylinder 11 to the installation position of the exhaust igniter 21 is equal to or less than a volume of the air-fuel mixture in the exhaust passage 18, that is, the volume of the air-fuel mixture at the pressure in the exhaust passage 18. The volume of the air-fuel mixture in the exhaust passage 18 is discharged from the cylinder 11 in one exhaust stroke. With the above configuration, the air-fuel mixture discharged from the cylinder 11 in one exhaust stroke can be ignited without waiting for the next exhaust stroke, and thus it is possible to shorten a retention time of uncombusted air-fuel mixture in the exhaust passage 18. As a result, the diffusion of the uncombusted air-fuel mixture can be reduced or prevented, and thus the fuel is substantially completely combusted in the exhaust passage 18 with more reliability, and an amount of air pollutants that are discharged in the preheating process can be reduced. The internal volume of the exhaust passage 18 is calculated based on an internal space of the exhaust passage 18. The internal space has an end at each cylinder 11 and an end at the exhaust igniter 21. The end at each cylinder 11 is a virtual plane including an annular portion in contact with the exhaust valve 112 of each cylinder 11, and the end at the exhaust igniter 21 is a virtual plane that is perpendicular to the center line of the exhaust passage 18 and passes through the center of a gap where the exhaust igniter 21 generates a spark.

Figure 2:
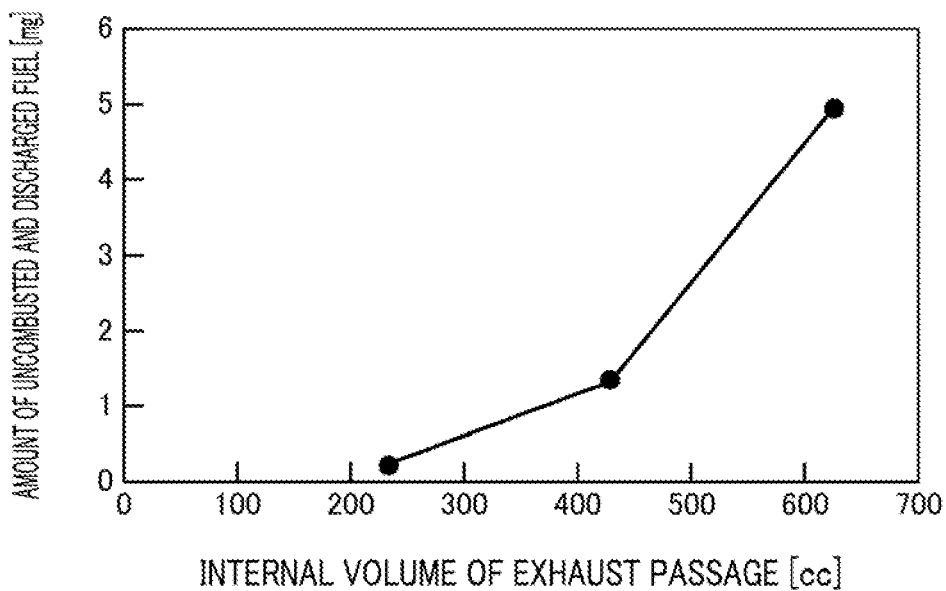
FIG. 2 is a graph illustrating an example of a relationship between a position of an exhaust igniter and an amount of uncombusted and discharged fuel.

FIG. 2 illustrates the relationship between the position of the exhaust igniter and the amount of the air pollutant emitted. Specifically, FIG. 2 illustrates results of the following test. Internal combustion engines of various specifications were provided. The engines were two-liter in-line four-cylinder gasoline engines and were different from each other in that the installation position of an exhaust igniter in an exhaust passage were different. In a preheating process of a catalytic converter of each internal combustion engine, the catalyst of each internal combustion engine was heated at a temperature from 20° C. to 350° C. A total weight of uncombusted fuel that passed through the catalytic converter per cycle of preheating process was measured, and the measurements were recorded as a graph. As can be appreciated from the graph, by making the internal volume of the exhaust passage up to the exhaust igniter be not more than 500 cc, which is the exhaust amount per cylinder, the amount of the air pollutants discharged can be kept lower.

The exhaust igniter 21 is preferably disposed in the collection part 182 so that the air-fuel mixture discharged from the plurality of cylinders 11 can be ignited, that is, the number of the exhaust igniters 21 can be reduced. The exhaust igniter 21 is preferably disposed downstream of the turbine 191 so as to prevent the turbine 191 from damaged due to combustion of the air-fuel mixture in the turbine 191 and to prevent a temperature drop of the combustion gas at the turbine 191.

The controller 22 controls the preheating process for heating the catalytic converter 20 by controlling supply of the air-fuel mixture to the exhaust passage 18 and ignition of the air-fuel mixture by the exhaust igniter 21. The controller 22 includes a memory, a processor, and the like, and may be configured with one or more computer devices that execute appropriate control programs. Further, the controller 22 may be integrated with an electronic control unit or the like that controls the operation of the internal combustion engine 1 for normal operation that outputs power of each component of the internal combustion engine 1.

The controller 22 preferably causes the crank electric motor 16 to drive the crankshaft 13 during the preheating process. With such a configuration, even in a case in which the crankshaft 13 is not driven from outside by human force or the like, it is possible to vertically reciprocate the pistons 12, suck combustion air into the cylinders 11, generate air-fuel mixture, and then stably introduce the generated air-fuel mixture into the exhaust passage 18. Therefore, the air-fuel mixture can be stably combusted in the exhaust passage 18, and thus the catalytic converter 20 can be heated efficiently.

The controller 22 may causes the turbo electric motor 193 to drive the compressor 192 during the preheating process. With this configuration, the pressure of the air-fuel mixture in the cylinder 11 can be increased even during the preheating process, and thus the air-fuel mixture can reach further downstream in the exhaust passage 18 in one exhaust stroke. For this reason, even in a case in which this configruation is provided with the supercharger 19, it is unnecessary to design the exhaust passage 18 such that the cross-sectional area thereof is smaller only in order to reduce or prevent the generation of air pollutants in the preheating process and thus cause a decrease in output due to an increase in exhaust resistance.

The controller 22 preferably controls preheating process such that an air-fuel mixture starts discharging from the cylinder 11 for which an internal volume of the exhaust passage 18 from the cylinder 11 to the installation position of the exhaust igniter 21 is smallest, that is, such that supply of fuel starts from the fuel supplier 15 of the cylinder 11 that is closest to the exhaust igniter 21. The smaller the internal volume of the exhaust passage 18 to the exhaust igniter 21, the greater the reduction in diffusion of the air-fuel mixture prior to being ignited by the exhaust igniter 21, and thus, allowing for a more appropriate combustion to be performed, resulting in being able to reduce the amount of the air pollutants that are discharged.

It is preferable that the controller 22, at least immediately after the start of the preheating process, causes the exhaust igniter 21 to generate, for each cylinder 11, a spark at least once during a period from when a cylinder 11 of the plurality of cylinders 11 starts the exhaust stroke to when another cylinder 11 of the plurality of cylinders 11 (for example, in an internal combustion engine having a plurality of banks such as a V engine, it is assumed that an exhaust igniter is disposed for each bank) that share the same exhaust igniter 21 starts the exhaust stroke. Theraby, the uncombusted air-fuel mixture discharged from each cylinder 11 can be reliably ignited with substantially no interval, and therefore the amount of the air pollutants that are discharged can be more reliably reduced. After continuous combustion of fuel is established in the exhaust passage 18, ignition by the exhaust igniter 21 may be stopped.

Figure 3:
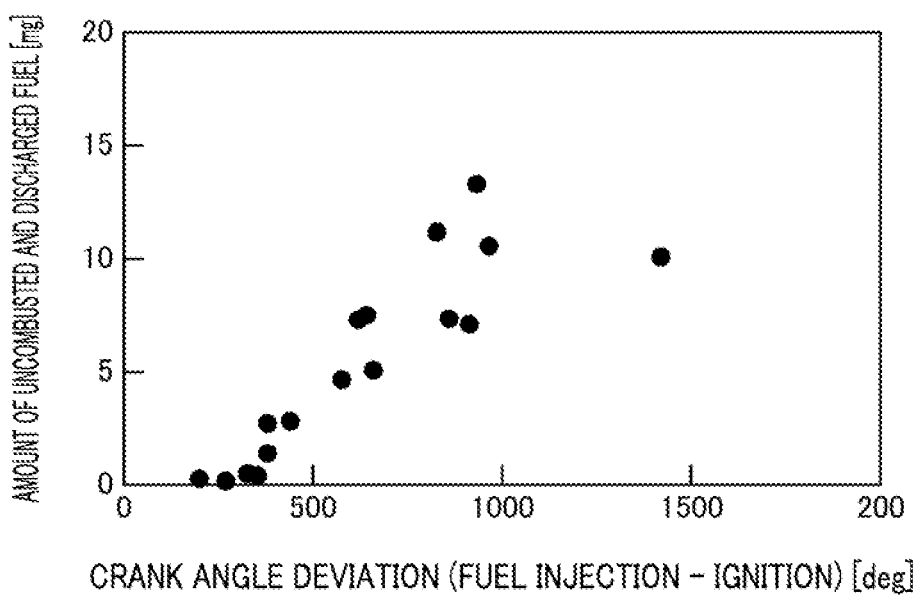
FIG. 3 is a graph illustrating a relationship between a time from fuel injection to ignition and an amount of uncombusted and discharged fuel.

FIG. 3 illustrates results obtained by simulating amounts of uncombusted fuel discharged by changing an ignition timing of the exhaust igniter 21 in the same engines as in the test illustrated in FIG. 2. In such a way, as the time period from fuel injection to ignition increases, the amount of the air pollutants that are discharged increases. Therefore, the amount of the air pollutants that are discharged can be reduced by causing, at least immediately after the start of the preheating process, the exhaust igniter 21 to generate, for each cylinder 11, a spark at least once during a period from when a cylinder 11 of the plurality of cylinders 11 starts the exhaust stroke to when another cylinder 11 of the plurality of cylinders 11 starts the exhaust stroke. FIG. 3 illustrates the ignition timing as the crank angle from the fuel injection. However, the reference point close to the exhaust stroke is simply selected, and does not intend that an appropriate ignition timing depends on the timing of the fuel injection.

As described above, in the internal combustion engine 1, the internal volume of the exhaust passage 18 to the installation position of the exhaust igniter 21 is equal to or less than the volume of the air-fuel mixture discharged from the cylinder 11 in one exhaust stroke, and thus it is possible to shorten a retention time of uncombusted air-fuel mixture in the exhaust passage 18. With the above configuration, diffusion of the uncombusted air-fuel mixture can be reduced or prevented, and therefore the fuel can be substantially completely combusted in the exhaust passage 18 with more reliability, allowing the amount of the air pollutants that are discharged in the preheating process to be reduced.

OTHER EMBODIMENTS

In the embodiment of the internal combustion engine described above, the air-fuel mixture is generated in the cylinder, and the generated air-fuel mixture is introduced into the exhaust passage. The fuel supplier may be provided in the exhaust passage and the air-fuel mixture may be generated in the exhaust passage.

EXPLANATION OF REFERENCE NUMERALS 1 internal combustion engine
11 cylinder
111 air supply valve
112 exhaust valve
12 piston
13 crankshaft
14 cylinder igniter
15 fuel supplier
16 crank electric motor
17 intake passage
18 exhaust passage
181 branch part
182 collection part 19 supercharger
191 turbine
192 compressor
193 turbo electric motor
20 catalytic converter
21 exhaust igniter
22 controller

What is claimed is:

1. An internal combustion engine comprising:
a cylinder;
a piston housed in the cylinder;
a crankshaft coupled to the piston;
a cylinder igniter that generates a spark in an interior of the cylinder;
an intake passage that supplies combustion air to the cylinder;
a fuel supplier that supplies fuel to the intake passage or the cylinder;
an exhaust passage that discharges from the cylinder exhaust gases generated by combustion of an air-fuel mixture of the combustion air and the fuel in the cylinder;
a catalytic converter disposed in the exhaust passage;
an exhaust igniter disposed upstream of the catalytic converter in the exhaust passage and that generates a spark in an interior of the exhaust passage; and
a controller that controls a preheating process for heating the catalytic converter by controlling supply of the air-fuel mixture to the exhaust passage and ignition of the air-fuel mixture by the exhaust igniter,
wherein an internal volume of the exhaust passage from the cylinder to an installation position of the exhaust igniter is equal to or less than a volume of the air-fuel mixture discharged from the cylinder in one exhaust stroke in the exhaust passage.

2. The internal combustion engine according to claim 1, further comprising a supercharger including a turbine provided in the exhaust passage and a compressor provided in the intake passage, wherein the exhaust igniter is disposed downstream of the turbine.

3. The internal combustion engine according to claim 2, wherein the supercharger further includes a turbo electric motor capable of driving the compressor, and the controller causes the turbo electric motor to drive the compressor during the preheating process.

4. The internal combustion engine according to claim 1, comprising a plurality of the cylinders, wherein the exhaust passage includes a plurality of branch parts connecting to the cylinders on a one-to-one basis, and a collection part at which the plurality of branch parts converges, and the exhaust igniter is disposed in the collection part.

5. The internal combustion engine according to claim 4, wherein the controller starts discharging smallest amount of the air-fuel mixture from the cylinder for which the internal volume of the exhaust passage from the cylinder to the installation position of the exhaust igniter, in the preheating process.

6. The internal combustion engine according to claim 4, wherein the controller, at least immediately after a start of the preheating process, causes the exhaust igniter to generate, for each cylinder, a spark at least once during a period from when a cylinder of the plurality of cylinders starts the exhaust stroke to when another cylinder of the plurality of cylinders that share the exhaust igniter starts the exhaust stroke.

7. The internal combustion engine according to claim 1, further comprising a crank electric motor capable of driving the crankshaft, wherein the controller causes the crank electric motor to drive the crankshaft during the preheating process.

* * * * *